United States Patent [19]
Matsuura et al.

[11] 3,923,527
[45] Dec. 2, 1975

[54] COLORED GLASS

[75] Inventors: Takashi Matsuura, Fussa; Fumio Chihara, Akishima, both of Japan

[73] Assignee: Hoya Glass Works, Ltd., Tokyo, Japan

[22] Filed: Mar. 4, 1974

[21] Appl. No.: 447,793

[30] Foreign Application Priority Data
Aug. 17, 1973 Japan.............................. 48-92179

[52] U.S. Cl............. 106/47 R; 106/47 Q; 106/73.2; 106/73.3; 106/73.33; 106/73.4
[51] Int. Cl.[2].......................................... C03C 3/00
[58] Field of Search...... 106/47 R, 47 Q, 73.2, 73.3, 106/73.33, 73.4

[56] References Cited
UNITED STATES PATENTS

| | | | |
|---|---|---|---|
| 2,532,386 | 12/1950 | Armistead | 106/47 R |
| 2,854,349 | 9/1958 | Dreyfus et al. | 106/47 R |
| 2,913,350 | 11/1959 | Upton | 106/47 R |
| 3,615,761 | 10/1971 | Sakka | 106/47 R |
| 3,640,827 | 2/1972 | Lutz | 106/47 R |
| 3,746,556 | 7/1973 | Morgan | 106/47 R |

*Primary Examiner*—Patrick P. Garvin
*Assistant Examiner*—John F. Niebling
*Attorney, Agent, or Firm*—Sughrue, Rothwell, Mion, Zinn & Macpeak

[57] ABSTRACT

A $P_2O_5$—$Al_2O_3$ type colored glass containing CuO, and as especially preferable types, a $P_2O_5$—$Al_2O_3$—$Li_2O$ type colored glass containing CuO as well as a $P_2O_5$—$Al_2O_3$—ZnO, CdO type colored glass containing CuO, where the content of CuO is 0.5 to 10 parts by weight per 100 parts by weight of the parent glass compositions. The first preferable colored glass selectively absorbs rays having a wavelength in the range of 600 nm or more, and the latter selectively absorbs rays having a wavelength in the range of 550 to 600 nm or more.

4 Claims, 2 Drawing Figures

COLORED GLASS

BACKGROUND OF THE INVENTION

1. Field of the Invention

This invention relates to a $P_2O_5$—$Al_2O_3$—$CuO$ type colored glass which selectively absorbs rays having a wavelength of 600 nm or more and suppresses the absorption of rays of 400 nm or less.

This invention also relates to a $P_2O_5$—$Al_2O_3$—$Li_2O$—$CuO$ type colored glass which selectively absorbs rays having a wavelength in the range of 600 nm or more.

This invention further relates to another $P_2O_5$—$Al_2O_3$—$ZnO$, $CdO$—$CuO$ type colored glass which selectively absorbs rays having a wavelength in the range of 550 to 600 nm or more.

2. Description of the Prior Art

A colored glass plate which selectively absorbs blue, green and red light has heretofore been used in the production of color prints. Recently, a blue colored glass plate has been used for correction of light-sensitive elements. Since present light-sensitive elements are highly sensitive to rays in the infrared range, the blue colored glass plate which absorbs these rays in the infrared range is used for the purpose of correcting the sensitivity of the elements to normal visible sensitivity.

In general, CuO is added to parent glass compositions for the preparation of a colored glass which absorbs rays having a wavelength in the range of 600 nm or more or 550 to 600 nm or more. However, the addition of CuO is defective in that the resulting colored glass absorbs not only rays of 600 nm or more or of 550 to 600 nm or more but also those of 400 nm or less. In addition, the resulting colored glass cannot sharply absorb rays having a wavelength of 600 nm or more, or of 550 to 600 nm or more, which is another defect.

SUMMARY OF THE INVENTION

The present invention provides a $P_2O_5$—$Al_2O_3$ type colored glass and, as especially preferable types, a $P_2O_5$—$Al_2O_3$—$Li_2O$ type colored glass and a $P_2O_5$—$Al_2O_3$—$ZnO$, $CdO$ type colored glass, which are free from the above-described defects.

In these colored glasses of this invention, the parent glass compositions $P_2O_5$—$Al_2O_3$—$Li_2O$ or $P_2O_5$—$Al_2O_3$—$ZnO$, $CdO$ are selected each in an amount within an extremely limited range so as to suppress the absorption of rays of 400 nm or less and to augment the sharp absorption of rays of 600 nm or more or 550 to 600 nm or more.

In the $P_2O_5$—$Al_2O_3$—$CdO$, $ZnO$ type colored glass of this invention, the improved advantages are that (1) the absorption limit is from 600 nm to 550 nm in accordance with the use of glass and (2) the fusibility of the respective glass components is improved thereby to improve the color reproducibility of the resulting glass.

Accordingly, the objects of this invention are achieved by providing a colored glass consisting of parent glass compositions comprising by weight, 75 to 88 % of $P_2O_5$, 0 to 15 % of $Li_2O$ + $Na_2O$ + $K_2O$ in which the $Na_2O$ is 0 to 5 % and the $K_2O$ is 0 to 5 %, 3 to 14 % of $Al_2O_3$, 0 to 15 % of RO in which R represents Mg, Ca, Sr or Ba, 0 to 5 % of $B_2O_3$, 0 to 5 % of $ZrO_2$, 0 to 5 % of $TiO_2$, 0 to 5 % of $La_2O_3$ and 0 to 20 % of ZnO + CdO, and 0.5 to 10 parts of CuO per 100 parts of the parent glass compositions; a colored glass consisting of parent glass compositions comprising by weight, 75 to 88 % of $P_2O_5$, 6 to 15 % of $Li_2O$, 3 to 14 % of $Al_2O_3$, 0 to 5 % of $Na_2O$, 0 to 5 % of $K_2O$, 0 to 5 % of $B_2O_3$, 0 to 5 % of $ZrO_2$, 0 to 5 % of $TiO_2$, 0 to 5 % of $La_2O_3$, 0 to 5 % of MgO and 0 to 5 % of ZnO, and 0.5 to 10 parts of CuO per 100 parts of the parent glass compositions; and a preferable colored glass consisting of parent glass compositions comprising by weight, 75 to 85 % of $P_2O_5$, 3 to 9 % $Al_2O_3$, 5 to 20 % of ZnO + CdO, 0 to 15 % of RO in which R represents Mg, Ca, Sr or Ba, 0 to 15 % of $Li_2O$, 0 to 5 % of $B_2O_3$, 0 to 5 % of $La_2O_3$, 0 to 5 % of $ZrO_2$ and 0 to 5 % of $TiO_2$, and 0.5 to 10 parts of CuO per 100 parts of the parent glass compositions.

BRIEF DESCRIPTION OF THE ACCOMPANYING DRAWINGS

FIG. 1 shows a transmittance curve of each of the glasses 1 through 8 as set forth in Example 1, and FIG. 2 shows the transmittance curve of each of the glasses 1 through 8 in Example 2.

DETAILED DESCRIPTION OF THE INVENTION

Figure 1:
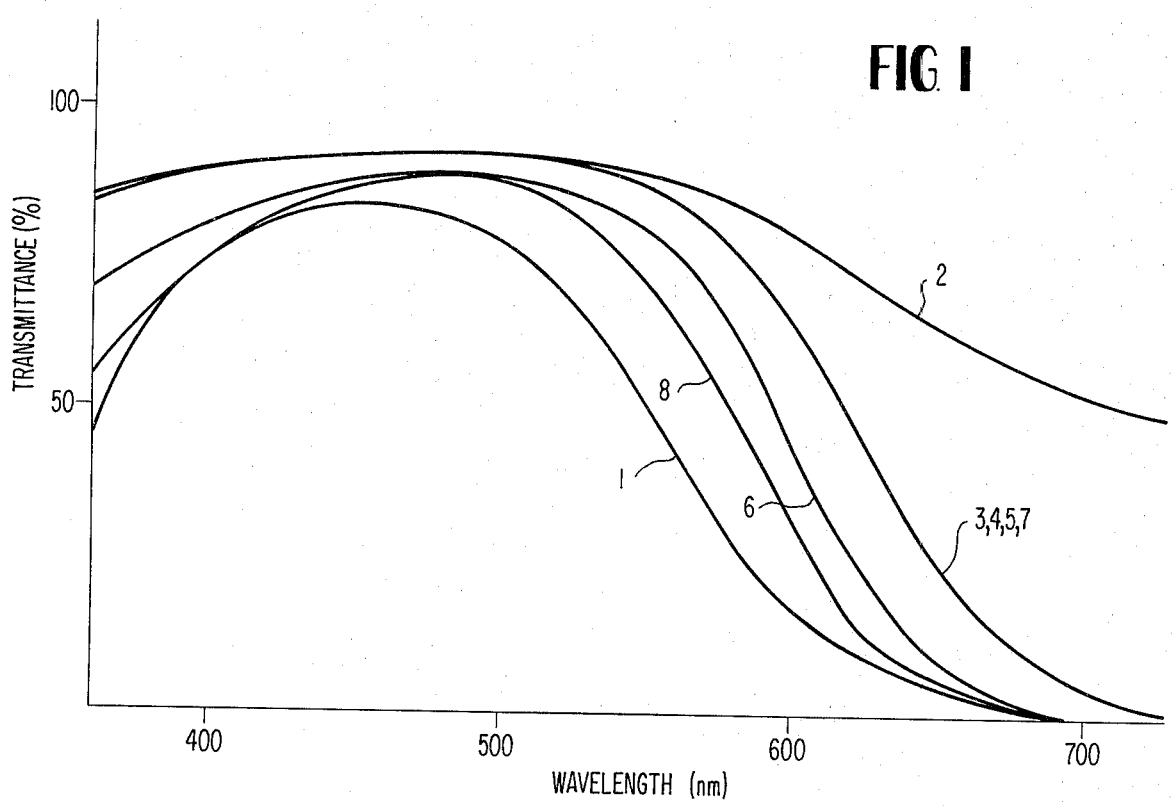

In the $P_2O_5$—$Al_2O_3$ type colored glass, the content of each of the parent glass components $P_2O_5$ and $Al_2O_3$ is critical in that glasses falling outside the ranges set forth cannot sufficiently suppress absorption of rays of 400 nm or less and further cannot sharply absorb rays of 600 nm or more. $Li_2O$ can be introduced in an amount of up to 15 % by weight, and substituted by $Na_2O$ and/or $K_2O$ in an amount of up to 5 % by weight. $Al_2O_3$ is introduced for the purpose of improving the durability of glass, and if the content of $Al_2O_3$ is 3 % by weight or less, the durability is extremely degraded and the glass obtained is not sufficiently durable for any practical use.

RO in which R represents Ba, Ca, Mg or Sr, $B_2O_3$, $ZrO_2$, $TiO_2$, $La_2O_3$ and ZnO can be incorporated, each in an amount of up to 5 % by weight, without affecting the desired trancemittance, for the purpose of improving the durability of the resulting glass.

ZnO + CdO is effective for suppressing the absorption of rays having a wavelength of 400 nm or less in an amount of up to 20 % by weight. The amount of CuO to be added is suitably in the range of 0.5–10 weight parts per 100 weight parts of the above parent glass compositions, and any other range than this described range is unsuitable in that glasses falling outside this range are not suitable for use in the production of color prints and the correction of light-sensitive elements.

In the $P_2O_5$—$Al_2O_3$—$Li_2O$ type colored glass, the content of each of the parent glass components $P_2O_5$, $Al_2O_3$ and $Li_2O$ is critical in that glasses falling outside the ranges set forth cannot sufficiently suppress absorption of rays of 400 nm or less and further cannot sharply absorb rays of 600 nm or more. $Li_2O$ can be substituted by $Na_2O$ and/or $K_2O$ in an amount of up to 5 % by weight. $Al_2O_3$ is introduced for the purpose of improving the durability of glass, and if the content of $Al_2O_3$ is 3 % by weight or less, the durability is extremely degraded and the glass obtained is not sufficiently durable for any practical use.

$B_2O_3$, $ZrO_2$, $TiO_2$, $La_2O_3$, MgO and ZnO can be incorporated, each in an amount of up to 5 % by weight, without affecting the desired transmittance, for the purpose of improving the durability of the resulting glass.

The amount of CuO to be added is suitably in the range of 0.5 to 10 parts by weight per 100 parts by weight of the above described parent glass compositions, and any other range than this described range is not suitable in that glasses falling outside this range are not suitable for use in the production of color prints and the correction of light-sensitive elements.

In this type of glass, the following compositions are suitable for mass production. That is, the compositions comprise by weight, 80 to 85 % of $P_2O_5$, 6 to 9 % of $Li_2O$ and 3 to 6 % of $Al_2O_3$, and 0.5 to 10 parts of CuO per 100 parts of the parent glass compositions.

In another $P_2O_5$—$Al_2O_3$—ZnO, CdO type colored glass of this invention, the content of each of the parent glass compositions, $P_2O_5$, $Al_2O_3$ and ZnO + CdO set forth, also is critical because of the same reasons as described above concerning the above described $P_2O_5$—$Al_2O_3$ or $P_2O_5$—$Al_2O_3$—$Li_2O$ type colored glass, or more precisely, in that a glass falling outside the ranges set forth cannot sufficiently suppress the absorption of rays having a wavelength of 400 nm or less and further cannot sharply absorb rays of 550 to 600 nm or more.

$Al_2O_3$ is a component introduced for the purpose of improving the durability of the glass, and if the content of $Al_2O_3$ is 3 % by weight or less, the durability is extremely degraded and the glass obtained is not sufficiently durable for any practical use.

In particular, MgO of the RO components is effective when it is necessary to shift the absorption end limit to the shorter wavelength side in accordance with the use of the glass, and further, MgO also is effective for increasing the viscosity of the glass compositions thereby to improve the moldability thereof. However, if the content of MgO exceeds 15 % by weight, a glass containing such a large amount of MgO no longer suppresses the absorption of rays of 400 nm or less.

BaO is effective for preventing devitrification to some degree and improving the durability of the glass, but if the content thereof exceeds 15 % by weight, a glass containing such a larger amount of BaO no longer suppresses the absorption of rays of 400 nm or less. CaO and SrO can be incorporated each in an amount of up to 15 % by weight without any remarkable effect on the prevention of absorption of rays of 400 nm or less. These RO components can be used in the form of a mixture of these components, but the total amount of these components must not exceed 15 % by weight. $Li_2O$ can be incorporated in an amount of up to 15 % by weight, but if the content thereof exceeds 15 % by weight, the objects of this invention cannot be attained.

In addition to these ingredients, $B_2O_3$, $ZrO_2$, $TiO_2$ and $La_2O_3$ can be incorporated each in an amount of up to 5 % by weight without affecting the desired transmittance curve, for the purpose of improving the durability of the resulting glass.

The amount of CuO which is added is suitably in the range of 0.5 to 10 parts by weight per 100 parts by weight of the above described parent glass compositions, and compositions outside this range are not suitable in that glasses falling outside this range no longer are suitable for use in the production of color prints and the correction of light-sensitive elements.

In this type of glass, the following compositions are especially suitable for mass production. That is the compositions comprise by weight, 80 to 82 % of $P_2O_5$, 6 to 9 % of $Al_2O_3$, 10 to 20 % of ZnO and 2 to 7 % of MgO, and 0.5 to 10 parts of CuO per 100 parts of the parent glass compositions.

Now, the present invention will be explained in greater detail by reference to the following Examples.

Unless otherwise indicated, all parts, percentages, ratios and others are by weight.

EXAMPLE 1

In the following Table 1, various glass compositions are shown, where No. 1 is a comparative glass and Nos. 2 through 8 are glasses of this invention.

FIG. 1 shows the transmittance curve of each of these glasses 1 through 8.

Comparing glasses 2 through 8 of this invention with the comparative glass 1 with respect to each transmittance curve in FIG. 1, it can be seen that the present glasses suppress the absorption of rays having a wavelength in the range of 400 nm or less very well and can sharply absorb rays of 600 nm or more.

Table 1

| Composition No. | 1 | 2 | 3 | 4 | 5 | 6 | 7 | 8 |
|---|---|---|---|---|---|---|---|---|
| $P_2O_5$ | — | 80.0 | 76.0 | 76.0 | 76.0 | 85.0 | 76.0 | 85.0 |
| ($SiO_2$) | 60 | — | — | — | — | — | — | — |
| $Al_2O_3$ | — | 8.0 | 5.0 | 5.0 | 11.0 | 8.0 | 13.0 | 14.0 |
| $Li_2O$ | — | 8.0 | 12.0 | 12.0 | 8.0 | 6.0 | 7.0 | — |
| $Na_2O$ | 7.0 | — | 1.0 | — | — | — | 1.5 | — |
| $K_2O$ | 10.0 | — | 1.0 | — | — | — | 2.0 | — |
| $B_2O_3$ | 8.0 | 3.0 | — | 3.0 | 0.5 | — | 0.5 | — |
| $ZrO_2$ | — | — | 2.5 | — | — | — | — | 1.0 |
| $TiO_2$ | — | 1.0 | — | 0.5 | — | 1.0 | — | — |
| $La_2O_3$ | — | — | 2.5 | — | — | — | — | — |
| MgO | — | — | — | 1.5 | 2.5 | — | — | — |
| ZnO | 10.0 | — | — | 2.0 | 2.0 | — | — | — |
| (CaO) | 5.0 | — | — | — | — | — | — | — |
| CuO | 3.0 | 0.7 | 3.5 | 3.7 | 3.0 | 7.5 | 1.0 | 1.0 |

The above described glasses can be prepared as follows: The respective ingredients set forth in the above Table 1 are admixed in the form of oxides or other salts, and the resulting mixture is melted, refined and stirred in a ceramic or platinum crucible for 3 hours at 1,000° to 1,300°C, and then is cast into a mold or is cooled in the crucible.

EXAMPLE 2

In the following Table 2, various glass compositions are shown, where No. 1 is a comparative glass and Nos. 2 through 8 are glasses of this invention.

Figure 2:
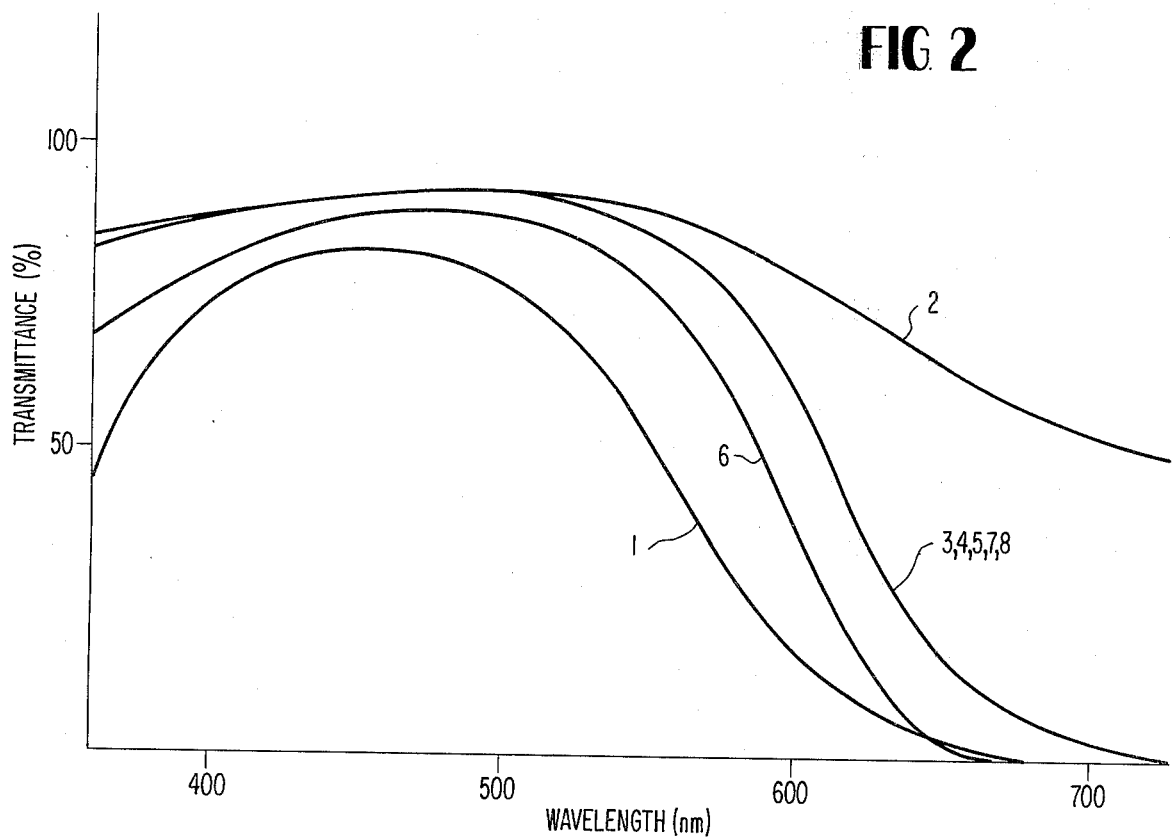

FIG. 2 shows the transmittance curve of each of these glasses 1 through 8.

Comparing glasses 2 through 8 of this invention with the comparative glass 1 with respect to each transmittance curve in FIG. 2, it can be seen that the present glasses suppress the absorption of rays having a wavelength in the range of 400 nm or less quite well and can sharply absorb rays of 550 to 600 nm or more.

Table 2

| Composition No. | 1 | 2 | 3 | 4 | 5 | 6 | 7 | 8 |
|---|---|---|---|---|---|---|---|---|
| $P_2O_5$ | — | 78.0 | 80.0 | 78.0 | 83.0 | 76.0 | 76.0 | 76.0 |
| ($SiO_2$) | 60.0 | — | — | — | — | — | — | — |
| $Al_2O_3$ | 3.9 | 7.0 | 4.0 | 4.0 | 7.0 | 4.0 | 5.0 | 4.0 |
| ZnO | 5.0 | 5.0 | 8.0 | 6.0 | 4.5 | 12.0 | 4.2 | 4.0 |
| CdO | — | 7.0 | 2.0 | 4.0 | 1.5 | 5.0 | 1.8 | 2.0 |
| MgO | — | — | 2.5 | — | 0.5 | — | 6.0 | — |
| CaO | 8.1 | 2.0 | — | 1.5 | 1.5 | — | 4.0 | — |
| SrO | — | — | — | — | 1.0 | — | — | — |
| BaO | 5.0 | — | 1.5 | 2.5 | 1.0 | — | 2.0 | — |
| $Li_2O$ | 10.0 | — | — | 1.0 | — | — | — | 13.0 |
| $B_2O_3$ | 8.0 | — | — | 1.0 | — | 3.0 | — | — |
| $La_2O_3$ | — | — | — | 2.0 | — | — | — | — |
| $ZrO_2$ | — | 1.0 | — | — | — | — | 1.0 | — |
| $TiO_2$ | — | — | 2.0 | — | — | — | — | 1.0 |
| CuO | 3.0 | 0.7 | 2.8 | 2.8 | 2.5 | 7.0 | 4.5 | 3.0 |

The above described glasses can be prepared in a manner similar to that described in Example 1.

While the invention has been described in detail and with reference to the specific embodiments thereof, it will be apparent to one skilled in the art that various changes and modifications can be made therein without departing from the spirit and scope thereof.

What is claimed is:

1. A colored glass consisting of parent glass compositions consisting essentially of by weight, 75 to 88 % of $P_2O_5$, 6 to 15 % of $Li_2O$, 3 to 14 % of $Al_2O_3$, 0 to 5 % of $Na_2O$, 0 to 5 % of $K_2O$, 0 to 5 % of $ZrO_2$, 0 to 5 % of $TiO_2$, 0 to 5 % of $La_2O_3$, 0 to 5 % of MgO and 0 to 5 % of ZnO, and 0.5 to 10 parts of CuO per 100 parts of said parent glass compositions wherein said glass exhibits suppression of absorption of rays having a wavelength of 400 nm or less.

2. A colored glass consisting of parent glass compositions consisting essentially of by weight, 80 to 85 % of $P_2O_5$, 3 to 6 % of $Al_2O_3$ and 6 to 9 % of $Li_2O$, and 0.5 to 10 parts of CuO per 100 parts of said parent glass compositions wherein said glass exhibits suppression of absorption of rays having a wavelength of 400 nm or less.

3. A colored glass consisting of parent glass compositions consisting essentially of by weight, 75 to 85 % of $P_2O_5$, 3 to 9 % of $Al_2O_3$, 5 to 20 % of ZnO + CdO, 0 to 15 % of RO in which R represents Mg, Ca, Sr or Ba, 0 to 15 % of $Li_2O$, 0 to 5 % of $B_2O_3$, 0 to 5 % of $La_2O_3$, 0 to 5 % of $ZrO_2$ and 0 to 5 % of $TiO_2$, and 0.5 to 10 parts of CuO per 100 parts of said parent glass compositions wherein said glass exhibits suppression of absorption of rays having a wavelength of 400 nm or less.

4. A colored glass consisting of parent glass compositions consisting essentially of by weight, 80 to 82 % of $P_2O_5$, 6 to 9 % of $Al_2O_3$, 10 to 20 % of ZnO and 2 to 7 % of MgO, and 0.5 to 10 parts of CuO per 100 parts of said parent glass compositions wherein said glass exhibits suppression of absorption of rays having a wavelength of 400 nm or less.

* * * * *